United States Patent
Kingsbury et al.

(10) Patent No.: US 6,308,155 B1
(45) Date of Patent: Oct. 23, 2001

(54) FEATURE EXTRACTION FOR AUTOMATIC SPEECH RECOGNITION

(75) Inventors: Brian E. D. Kingsbury, Yorktown Heights, NY (US); Steven Greenberg; Nelson H. Morgan, both of Oakland, CA (US)

(73) Assignee: International Computer Science Institute, Berkeley, CA (US)

( * ) Notice: Subject to any disclaimer, the term of this patent is extended or adjusted under 35 U.S.C. 154(b) by 0 days.

(21) Appl. No.: 09/318,592

(22) Filed: May 25, 1999

Related U.S. Application Data
(60) Provisional application No. 60/116,684, filed on Jan. 20, 1999.

(51) Int. Cl.[7] .............................. G10L 15/02; G10L 15/14
(52) U.S. Cl. .......................... 704/256; 704/255; 704/251; 704/231
(58) Field of Search .................................... 704/206, 224, 704/225, 236, 234, 231, 251–256

(56) References Cited

U.S. PATENT DOCUMENTS

| | | | |
|---|---|---|---|
| 4,771,472 | * 9/1988 | Williams, III et al. | 381/94.2 |
| 5,119,432 | * 6/1992 | Hirsch | 324/76.19 |
| 5,450,522 | 9/1995 | Hermansky et al. | 395/2.2 |
| 5,537,647 | 7/1996 | Hermansky et al. | 395/2.2 |
| 5,604,839 | * 2/1997 | Acero et al. | 704/234 |
| 5,960,390 | * 9/1999 | Ueno et al. | 704/229 |

OTHER PUBLICATIONS

DeFatta "Digital Signal Processing", 1988, John Wiley, p. 45.*
Tavares, G.N. et al, "High Performance Algorithms for Digital Signal Processing", IEEE, May 1990, 1529–1532.*
Greenberg, S et a "The Modulation Spectrogram: In Pursuit of an Invariant Representation of Speech" IEEE, Apr. 1997, 1647–1650.*
Wu, Su–Lin et al "Integrated Syllable Boundary Information into Speech Recognition", IEEE, 1997, 987–990.*
Kingsbury, B.E.D. et al "Recognizing Reverbrant Speech with RASTA–PLP" IEEE, Apr. 1997,1259–1262.*
Avendo,C. et al "Data based Filter Design for RASTA–like Channel Normalization in ASR" ICSLP, Oct. 1996, 2087–2090.*
Drullman, R et al "Effect of Temporal Envelope Smearing on Speech Reception" JASA, Feb. 1994, 1053–1064.*
Wu, Su–Lin et al "Incorporating Information from Syllabel–length Time Scales into Automatic Speech Recognition" IEEE, May 1998, 1–159.*

(List continued on next page.)

*Primary Examiner*—Richemond Dorvil
*Assistant Examiner*—Daniel A Nolan
(74) *Attorney, Agent, or Firm*—Fish & Richardson P.C.

(57) ABSTRACT

An automatic speech recognition apparatus and method with a front end feature extractor that improves recognition performance under adverse acoustic conditions are disclosed. The inventive feature extractor is characterized by a critical bandwidth spectral resolution, an emphasis on slow changes in the spectral structure of the speech signal, and adaptive automatic gain control. In one the feature extractor includes a feature generator configured to compute short-term parameters of the speech signal, a filter system configured to filter the time sequences of the short-term parameters, and a normalizer configured to normalize the filtered parameters with respect to one or more previous values of the filtered parameters. Accordingly, the feature extractor is operable to carry out the following steps: computing short-term parameters of the speech signal; filtering time sequences of the short-term parameters; and normalizing the filtered parameters with respect to one or more previous values of the filtered parameters. The steps of filtering and normalizing preferably are performed independently of one another.

41 Claims, 7 Drawing Sheets

OTHER PUBLICATIONS

Greenberg & Kingsbury ("The Modulation Spectrogram: In Pursuit of an Invariant Representation of Speech," International Conference on Acoustics, Speech & Signal Processing, Apr. 1997).*

PCT Search Report from PCT/US00/01591 (counterpart foreign application).

Greenberg et al., "The Modulation Spectrogram: In Pursuit of an Invariant Representation of Speech," ICASSP, Oct. 1997, vol. 3, pp. 1647–1650.

Taveres et al., "High Performance Algorithms for Digital Signal Processing AGC Circuits and Systems," May 1990, vol. 2, pp., 1529–1532.

* cited by examiner

FEATURE EXTRACTION FOR AUTOMATIC SPEECH RECOGNITION

CROSS REFERENCE TO RELATED APPLICATIONS

This application is a continuation of provisional application Ser. No. 60/116,684, filed Jan. 20, 1999, entitled "Perceptually Inspired Signal-Processing Strategies for Robust Speech Recognition in Reverberant Environments," which is incorporated herein by reference.

BACKGROUND OF THE INVENTION

Automatic speech recognition has only recently emerged from the research laboratory as a viable technology. Among the automatic speech recognition systems that have been developed are large-vocabulary document dictation systems and automated telephone directory systems. Large vocabulary dictation systems typically require the use of head-mounted close-talking microphones, a relatively quiet operating environment and a considerable amount of speaker adaptation. Telephone-based systems, on the other hand, are operable over a wide range of telephone channel conditions with relatively little or no speaker adaptation; however, users typically are limited with respect to the kinds of speech input that is recognizable. For example, such systems typically require discontinuous speech input or limit the grammar or vocabulary of the recognizable speech.

The performance of all automatic speech recognition systems degrades when acoustic interference is present in the input speech signal. Such interference may include one or more of the following: extraneous sounds (additive noise) received from the speaker's environment or the communication channel, spectral shaping or nonlinear distortion imposed by the microphone or communication channel, and reverberation from the room in which the speaker is talking.

SUMMARY OF THE INVENTION

The invention features an automatic speech recognition apparatus and method with a front end feature extractor that improves recognition performance under adverse acoustic conditions. The inventive feature extractor is characterized by a critical bandwidth spectral resolution, an emphasis on slow changes in the spectral structure of the speech signal, and adaptive automatic gain control. The use of critical-band-like frequency resolution reduces the recognizer's sensitivity to speaker-dependent signal characteristics and enhances the recognizer's sensitivity to speech-dependent signal characteristics. The emphasis on slow changes in the spectral structure of the speech signal focuses the recognizer on the primary carrier of linguistic information in the speech signal, thereby improving the accuracy of the recognizer. The use of adaptive automatic gain control reduces the recognizer's sensitivity to unknown spectral shaping imposed on the speech signal. The combination of these features improves the reliability of the recognizer in the presence of acoustic interference (e.g., reverberation, additive noise, and unknown spectral shaping).

In one aspect, the invention features an apparatus for generating a parametric representation of a speech signal, comprising: a feature generator configured to compute short-term parameters of the speech signal; a filter system configured to filter the time sequences of the short-term parameters; and a normalizer configured to normalize the filtered parameters with respect to one or more previous values of the filtered parameters.

Embodiments may include one or more of the following features.

The feature generator preferably is configured to compute short-term spectral parameters of the speech signal. The feature generator preferably is configured to compute parameters of an auditory-like spectrum. The filter system preferably includes one or more linear filters. In one embodiment, the filter system includes a lowpass filter and a bandpass filter configured to operate in parallel. The lowpass filter may be characterized by a cutoff frequency of about 8 Hz and the bandpass filter may be characterized by a passband of about 8–16 Hz. The lowpass filter may be characterized by a moderate degree (e.g., 5 dB) of DC attenuation.

The normalizer preferably is configured to normalize the filtered parameters with respect to an average of preceding parameter values. The normalizer may include one or more feedback automatic gain control (AGC) networks. In one embodiment, each feedback network includes a feedback loop with a feedback lowpass filter. The feedback lowpass filter preferably is a single-pole IIR filter. In one embodiment, the normalizer includes two or more series-connected feedback AGC networks each having a single-pole IIR filter, the single-pole IIR filter of any one of the AGC networks being characterized by a cutoff frequency that is less than or equal to the cutoff frequency of the IIR filters in preceding AGC networks and greater than or equal to the cutoff frequency of the IIR filters in succeeding AGC networks. In accordance with this embodiment, the normalizer preferably includes first and second series-connected feedback AGC networks, the first AGC network having a single-pole lowpass IIR filter characterized by a cutoff frequency of about 1 Hz, and the second AGC network having a single-pole lowpass IIR filter characterized by a cutoff frequency of about 0.5 Hz.

In another aspect, the invention features a method for generating a parametric representation of a speech signal, comprising: computing short-term parameters of the speech signal; filtering time sequences of the short-term parameters; and normalizing the filtered parameters with respect to one or more previous values of the filtered parameters.

The steps of filtering and normalizing preferably are performed independently of one another.

Among the advantages of the invention are the following. The invention improves speech recognition performance by combining modulation filtering (in the amplitude domain) and automatic gain control processing in the front-end feature generator. The separation of these operations enables each step to be independently optimized, leading to better recognition performance. The invention reduces the error rate of automatic speech recognizers under degraded acoustic conditions, including reverberant conditions, additive noise and unknown spectral shaping. The invention may be applied to small-vocabulary and large-vocabulary recognizers to improve performance under degraded acoustic conditions.

Other features and advantages will become apparent from the following description, including the drawings and the claims.

DESCRIPTION OF THE PREFERRED EMBODIMENTS

I. Automatic Speech Recognizer—System Overview

Figure 1:
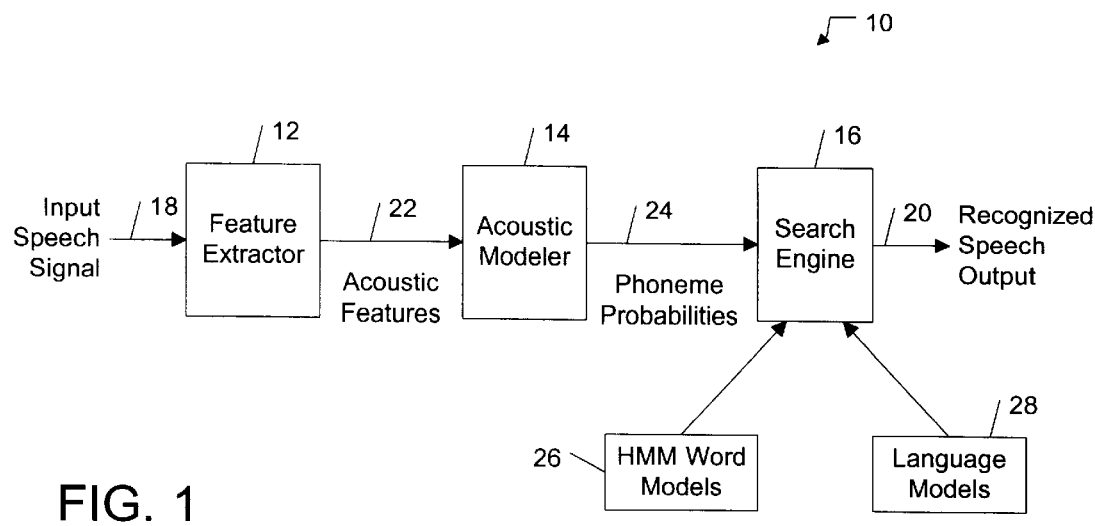
FIG. 1 is a block diagram of an automatic speech recognizer.

Referring to FIG. 1, an automatic speech recognizer 10 includes a feature extractor 12, an acoustic modeler 14, and a search engine 16 that together operate on an input speech signal 18 to produce a recognized speech output 20. Automatic speech recognizer 10 is configured to identify a sequence of words that best corresponds to input speech signal 18 based upon a similarity metric that accounts for acoustic similarity, phonotactics, syntax, and pragmatics. In particular, automatic speech recognizer 10 identifies the most probable sequence of words as determined by statistical pattern recognition techniques.

Feature extractor 12 processes input speech signal 18 to produce a set of acoustic features 22 which describe spectral features of the speech signal. As explained in detail below, the acoustic features produced by feature extractor 12 describe input speech signal 18 in a way that captures a significant amount of linguistic content (the phonetic identity of the incoming speech signal) while suppressing a significant amount of non-linguistic content (e.g., information about speaker identity, such as gender, vocal tract length, accent and age, and information about the acoustic environment and the input speech channel, such as background noise, filtering and reverberation). Feature extractor 12 includes separate processing stages for performing modulation filtering and normalizing the acoustic features extracted from input speech signal 18. In this way, the modulation filtering and normalization stages may be independently optimized to improve the overall performance of recognizer 10.

Acoustic modeler 14 estimates phone probabilities 24—the probability of each of the acoustic features 22 corresponding to different phonetic classes. In one embodiment, acoustic modeler 14 is a multilayer perceptron (MLP). The MLP is a two-layer, feedforward MLP that includes an input layer, a variable number (e.g., 300–2000) of hidden units, and as many output units as are needed to represent the context-independent phonemes in the recognizer vocabulary (e.g., 32–54). The hidden units are standard sigmoid units which compute the output activation y as $$y(x) = \frac{1}{1+e^{-w^T x}}$$

where w is the unit's weight vector and the input x is augmented with a constant element having a value of 1 so that $w^T x$ is an affine transform of x. The output layer of the MLP is a softmax layer in which the $k^{th}$ output unit computes its activation $g_k$ as $$g_k = \frac{e^{w_k^T x}}{\sum_{i=1}^{K} e^{w_i^T x}}$$

where $w_k$ is the weight vector for the k-th output unit and the input vector x is augmented with a constant element having a value of 1. The features are normalized to have zero mean and unit variance before they are input to the MLP. The mean and standard deviation for each feature is estimated from the MLP training set, and the features are normalized by subtracting the means and dividing by the standard deviations. The MLP is trained using on-line error back propagation with a cross-entropy error criterion. Additional information about the structure and operation of acoustic modeler 14 may be found in U.S. Provisional Application Ser. No. 60/116,684, which is entitled "Perceptually Inspired Signal-Processing Strategies for Robust Speech Recognition in Reverberant Environments."

In another embodiment, the acoustic modeler 14 classifies acoustic features 22 into different phonetic classes based upon Gaussian mixture models.

HMM (hidden Markov model) word modeler 26 provides a model of the speech signal in terms of a set of states, a set of time-independent transition probabilities between the states, and a probability distribution for each state describing the distribution of acoustic vectors. The HMM lexicon models the pronunciations and temporal characteristics of the words in the vocabulary of recognizer 10. The lexicon of HMM word models contains multiple pronunciations for each word in the vocabulary of recognizer 10. Minimum phoneme duration constraints are enforced by repeating states in the HMMs. The HMM transition probabilities in the lexicon are not trained; instead, the transition probabilities are fixed to 1/T, where T is the number of transitions leaving a given state (including the self loop).

In one embodiment, the HMM lexicon is generated as follows. A set of pronunciations that covered about 90% of the pronunciations in the training set is derived from phonetic transcriptions of the training utterances. Average context-dependent phoneme durations are calculated from the hand transcriptions of the training data. An initial HMM lexicon that incorporates all of the derived pronunciations and the calculated context-dependent phonemes is generated. The durations are included in the model by a sequence of n states, where n=d/(2s), d is the average duration of the phoneme, and s is that frame step time. Automatic speech recognizer 10 is trained using the hand transcriptions of the training set as targets and the generated lexicon. The resulting recognizer is used to relabel the training data by forced alignment. The final lexicon is generated by eliminating any of the derived pronunciations that were not used in the relabeling of the training set, computing new phonemes durations from the relabeling and compiling a new lexicon using the pruned set of pronunciations and the newly derived durations. This iterative procedure may be repeated multiple times.

Language modeler 28 estimates the probability (P(M)) associated with the sequence of words (M=$m_1, m_2, \ldots, m_m$) that preceded the current portion of input speech signal 18 being processed. Language modeler 28 uses a bigram grammar which approximates P(M) as $$P(M) \approx P(m_1 \mid s) P(e \mid m_n) \prod_{i=2}^{n} P(m_i \mid m_{i-1})$$

where s is the start symbol, $P(m_1|s)$ is the probability that $m_1$ is the first word of an utterance, e is the end symbol, and $P(e|m_n)$ is the probability that $m_n$ is the last word of an utterance. The bigram probabilities $P(m_i|m_{i-1})$ are estimated by counting word pairs in the training data. The probabilities of word pairs that never occur in the training set or do not occur frequently enough to permit reliable estimation of the conditional probability are approximated by $$P(y|x) \approx b_x P(y)$$

where P(y) is the prior probability of word y and $b_x$ is the "backoff weight" for word x. The prior probabilities for the individual words are calculated by counting words in the training set.

Methods for calculating backoff weights are described in, for example, K. W. Church et al., "A comparison of the enhanced Good-Turing and deleted estimation methods for estimating probabilities of English bigrams," *Computer Speech and Language*, 5(1): 19–54 (January 1991).

Search engine 16 combines phoneme probabilities 24 with the information received from HMM word modeler 16 and language modeler 28 to determine the most probable utterance, which corresponds to recognized speech output 20. Search engine 16 performs a Viterbi search using a dynamic programming search to compute the best state sequence (the Viterbi approximation) given the scaled acoustic likelihoods from the MLP, the lexicon of HMM models and the bigram probabilities from the language model.

The resulting recognized speech output 20, which is derived from acoustic features 22, is stable and robust under a wide variety of acoustic conditions, including the presence of acoustic interference such as reverberation, additive noise, and unknown spectral shaping.

II. Feature Extractor—Overview

Figure 2:
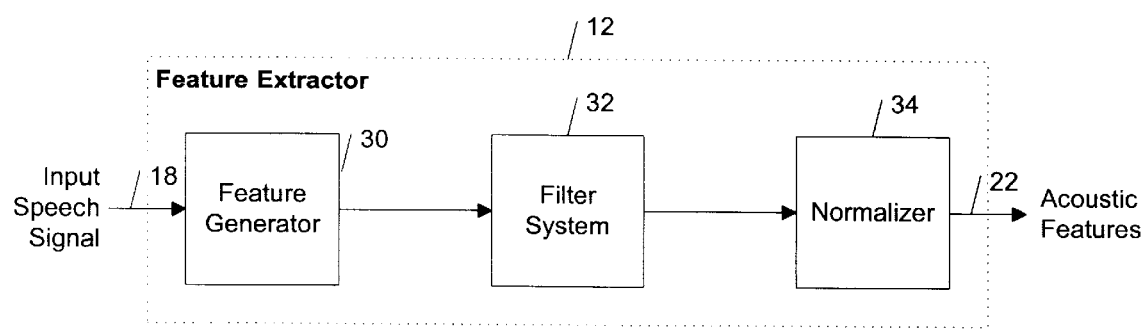
FIG. 2 is a block diagram of the basic features of a feature extractor for the automatic speech recognition system of FIG. 1.

Referring to FIG. 2, feature extractor 12 includes a feature generator 30 characterized by a critical bandwidth spectral resolution, a filter system 32 configured to emphasize slow changes in the spectral structure of input speech signal 18, and a normalizer 34 characterized by adaptive automatic gain control. The critical-band-like frequency resolution of feature generator 30 reduces the sensitivity of recognizer 10 to speaker-dependent signal characteristics and enhances the sensitivity of recognizer 10 to speech-dependent signal characteristics. The emphasis by filter system 32 on slow changes in the spectral structure of the speech signal enables feature extractor 12 to produce a set of acoustic features 22 that captures a significant amount of the linguistic content of input speech signal 18 while suppressing a significant amount of non-linguistic content to improve the performance of recognizer 10. The use of adaptive automatic gain control by normalizer 34 reduces the sensitivity of recognizer 10 to unknown spectral shaping which may be imposed on input speech signal 18.

The combination of these features improves the reliability of the recognizer, especially in the presence of acoustic interference (e.g., reverberation, additive noise and unknown spectral shaping). The performance of recognizer 10 is further improved by the ability to independently optimize filter system 32 and normalizer 34.

III. Feature Extractor—Detailed Implementation

Figure 3A:
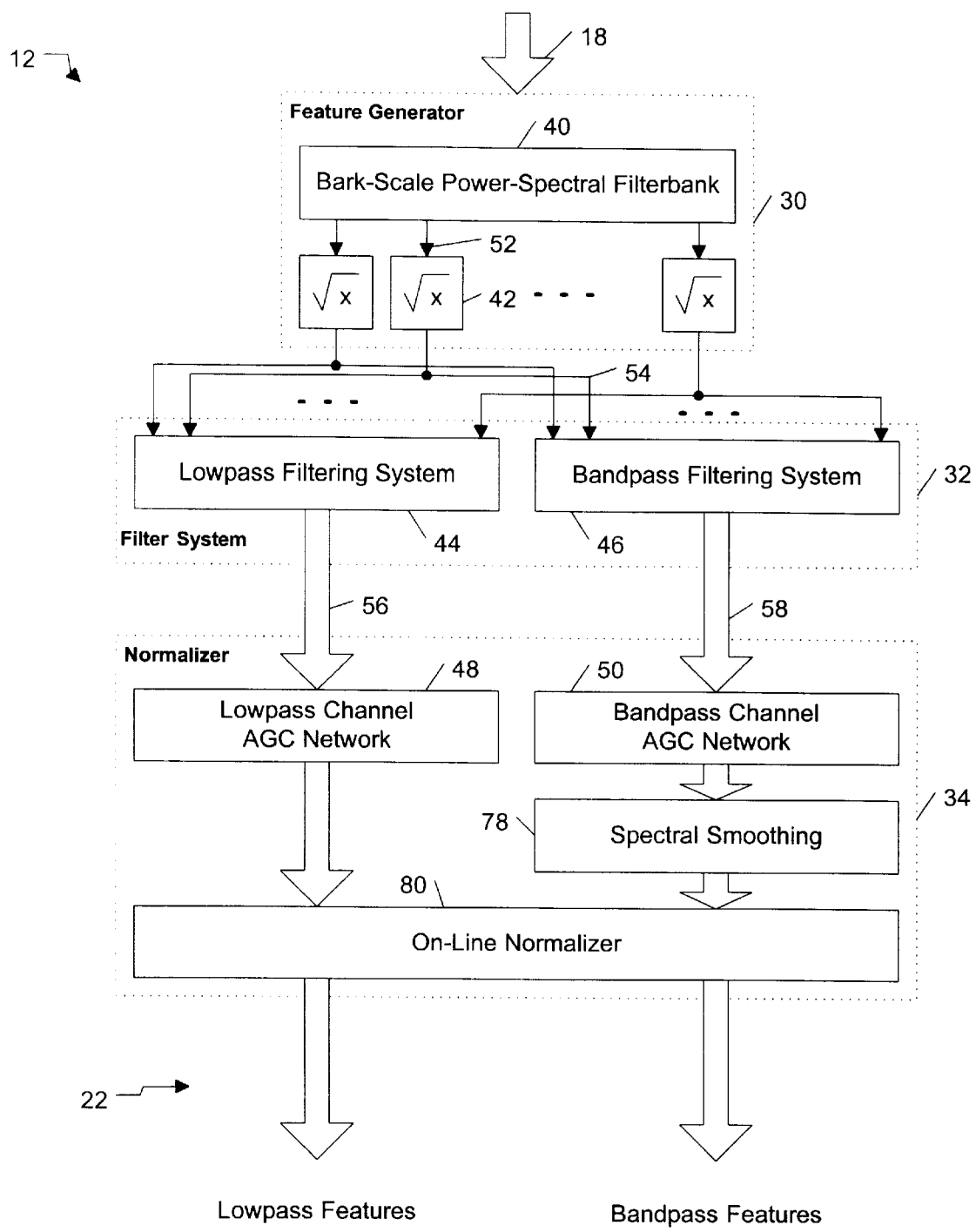
FIG. 3A is a block diagram of an embodiment of the feature extractor of FIG. 2.

Referring to FIG. 3A, in one embodiment of feature extractor 12, feature generator 30 includes a Bark-scale power-spectral filterbank 40 and a bank of square root generators 42, filter system 32 includes parallel lowpass and bandpass filtering systems 44, 46, and normalizer 34 includes AGC networks 48, 50.

Initially, feature generator 30 segments input speech signal 18 into 25 ms frames with a 10 ms frame step, each frame is multiplied by a Hamming window, and the power spectrum for each frame is computed with a Fast Fourier Transform (FFT). The power spectrum is accumulated into critical-band-like frequency channels 52 by convolution with filterbank 40. Filterbank 40 includes thirteen overlapping, triangular filters that have bandwidths and spacings of 0.95 Bark and cover the frequency range of 230–4000 Hz. The critical-band-like frequency channels 52 are converted into an amplitude spectrum 54 by square root generators 42 which are configured to take the square root of the output of filterbank 40.

Other filterbanks may be used. For example, Bark-scale filterbank 40 may be replaced by an FIR (finite impulse response) filterbank with a resolution (for both filter bandwidth and filter spacing) preferably in the range of ⅛ octave to 1 octave, and more preferably with a resolution of a quarter-octave. Alternatively, the triangular filters of filterbank 40 may be replaced by filters characterized by a trapezoidal magnitude response.

The resulting critical band amplitude spectrum 54 is filtered in parallel by lowpass filtering system 44 and bandpass filtering system 46 of filter system 32. Lowpass filter system 44 includes a bank of FIR lowpass filters with a passband of 0–8 Hz and 5 dB of DC suppression. Bandpass filter system 46 includes a bank of FIR bandpass filters with a passband of 8–16 Hz. Lowpass and bandpass filtering systems 44, 46 produce lowpass and bandpass filtered streams 56, 58, respectively.

Lowpass and bandpass filtered streams 56, 58 are processed through AGC networks 48, 50, respectively. Generally, a moderate degree of DC attenuation of the filters improves automatic-speech-recognition (ASR) performance. For example, in systems having a single filter with non-uniform group delay in its passband, 8, 9, or 11 dB of DC attenuation significantly improves ASR performance under reverberant acoustic conditions. In systems having two or more of the non-uniform group delay filters, 8 dB or less of DC attenuation usually provides good ASR performance under clean and reverberant acoustic conditions. In systems having linear-phase filters, 4 or 5 dB of DC attenuation usually provides the best overall performance. Each AGC network 48, 50 may include one or more series-connected feedback AGC units. The inclusion of frequency-local AGC in feature extractor 12 improves recognition robustness by reducing the effects of changes caused by unknown spectral shaping of input speech signal 18 and changes in overall signal level on the speech representation. In the modulation-spectral domain, the AGC normalization suppresses slowly-varying components of input speech signal 18 (i.e., components with very low modulation frequencies).

AGC networks having multiple feedback AGC units provide better gain normalization and onset enhancement than AGC networks having only a single feedback AGC unit. This improvement is due to the ability to match most auditory systems, which usually have central regions with adaptation time constants that are longer than adaptation time constants of peripheral regions. Specifically, AGC networks having multiple feedback AGC units can accommodate the need for varying time constants by constraining the time constants of feedback AGC units so that units later in the signal flow have time constants greater than time constants of the preceding feedback AGC units.

Figure 3B:
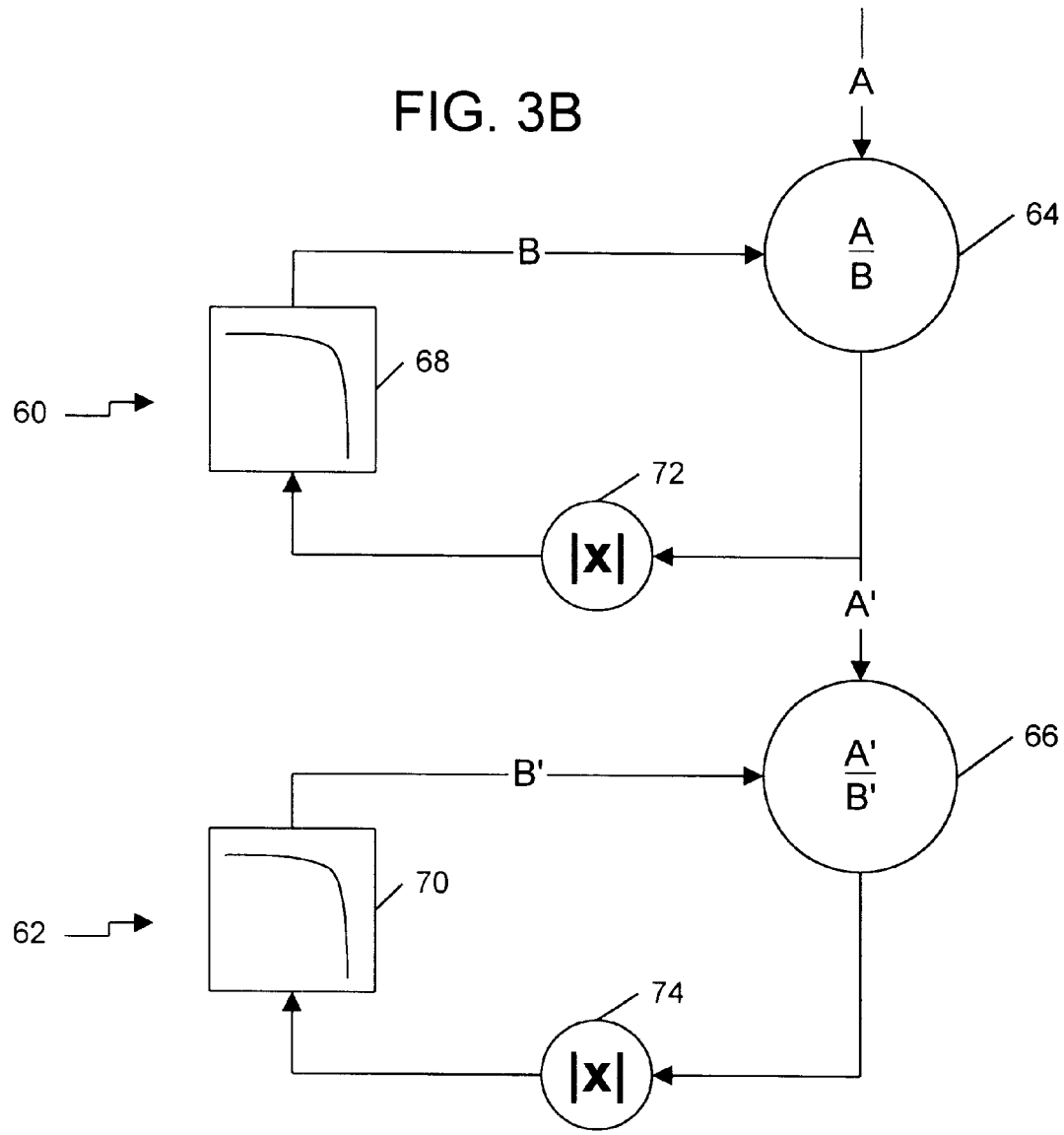
FIG. 3B is a block diagram of two series-connected AGC normalization units.

Referring to FIG. 3B, in one AGC embodiment, each channel 56, 58 of AGC networks 48, 50 includes upstream and downstream series-connected feedback AGC units 60, 62. Each AGC unit 60, 62 includes a divider unit 64, 66 and a single-pole UR (infinite impulse response) lowpass filter 68, 70 in the feedback loop. Filter 68 of upstream AGC unit 60 is characterized by a time constant of 160 ms, and filter 70 of downstream AGC 62 unit is characterized by a time constant of 320 ms. In terms of cut-off frequency (which is equal to the inverse of the quantity of the product of time constant and 2 π), filter 68 is characterized by a cutoff frequency of 1 Hz, and filter 70 is characterized by a cutoff frequency of 0.5 Hz. In operation, the absolute values 72, 74 of the outputs of divider units 64, 66 are fed back to the divider units 64, 66 through filters 68, 70 to permit the processing of both positive and negative input signals. If the input to one of the AGC units is x(t), the output of the AGC unit is y(t), the output of the corresponding lowpass filter is g(t), and the transfer function of the lowpass filter is $$H(z) = \frac{1-a}{1-az^{-1}},$$

then the AGC obeys the following relationships $x(t)=y(t)g(t)$ $g(t)=(1-a)|y(t)|+ag(t-1)$.

From these equations, the output y(t) of the AGC unit may be given as follows:

$$y(t) = \frac{-ag(t-1) + \sqrt{a^2g^2(t-1) + 4(1-a)x(t)}}{2(1-a)} \quad \text{if } x(t) \geq 0,$$

$$y(t) = \frac{ag(t-1) - \sqrt{a^2g^2(t-1) - 4(1-a)x(t)}}{2(1-a)} \quad \text{otherwise.}$$

For a steady-state input, the magnitude of the AGC output is the square root of the magnitude of the input, and the sign of the AGC output is the sign of the input. When the input varies, the AGC output is nearly proportional to the square root of the magnitude of the input, but the constant of proportionality is greater than one. Thus, the AGC is essentially a square-root compressor with a variable gain that depends upon the dynamics of the input. To prevent large transients on start-up, the AGC gain g(t) is initialized so that $g(0)=(x(0))^{1/2}$.

In another AGC embodiment, AGC network 48 may include two series-connected AGC units characterized by time constants of 160 and 320 ms, respectively. Additionally, AGC network 50 may include two-series connected AGC units characterized by time constants of 160 and 640 ms, respectively. This configuration provides the best general performance of automatic speech recognition under clean and reverberant acoustic conditions.

In another AGC embodiment, normalizer 34 may include three series-connected AGC units in the lowpass and bandpass channels. In this embodiment, the time constants of the AGC units increase from the upstream AGC to the downstream AGC unit. For example, the upstream AGC unit may have a time constant of 80 ms, the intermediate AGC unit may have a time constant of 320 ms, and the downstream AGC unit may have a time constant of 640 ms.

Figure 3C:
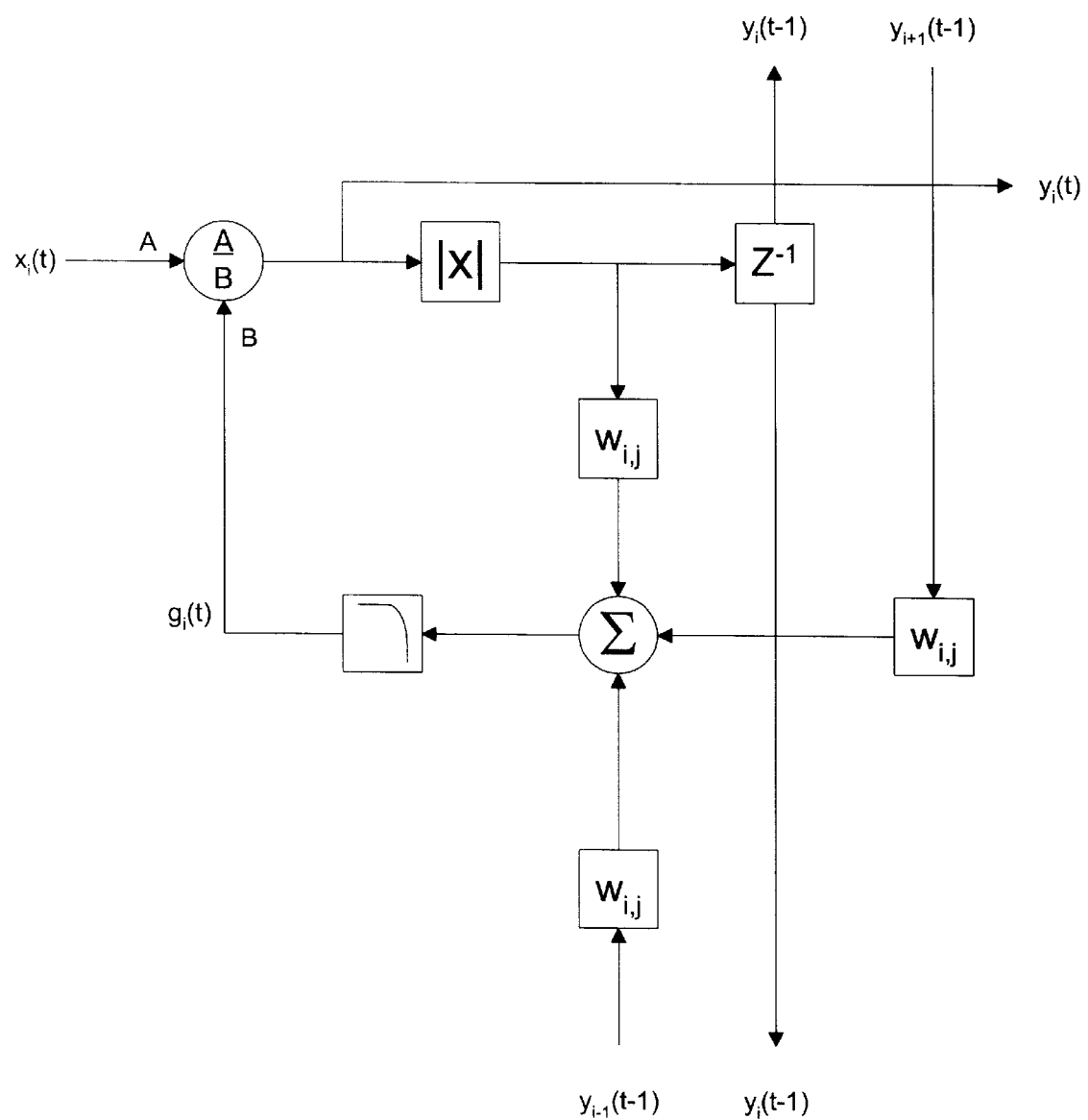
FIG. 3C is a block diagram of a cross-coupled AGC normalization unit.

In an alternative AGC embodiment, the lowpass and bandpass channels of normalizer 34 may include respective cross-coupled AGC systems in which the signal in a given channel is normalized by the gain that is estimated from the signal itself and from signals in neighboring channels. By coupling neighboring channels, the AGC systems emphasize spectral peaks and preserve spectral shape information that might otherwise be eliminated by fast-acting, per-channel AGC processing. One implementation of this embodiment is illustrated in FIG. 3C. In each channel the signal $x_i(t)$ is normalized by a factor $g_i(t)$ which is a temporally smoothed, weighted average of the signal level in the channel itself ($y_i(t)$) and in the other channels ($y_j(t)$, wherein j≠i). This embodiment enhances energy peaks in time and frequency by performing a form of lateral inhibition in addition to automatic gain control. The unit delays ($z^{-1}$) are included to simplify the coupled AGC computation. The $w_{i,j}$ factors are the coupling weights between channels. In FIG. 3C, only coupling between neighboring channels is portrayed; additional channel coupling may be used.

Figure 3D:
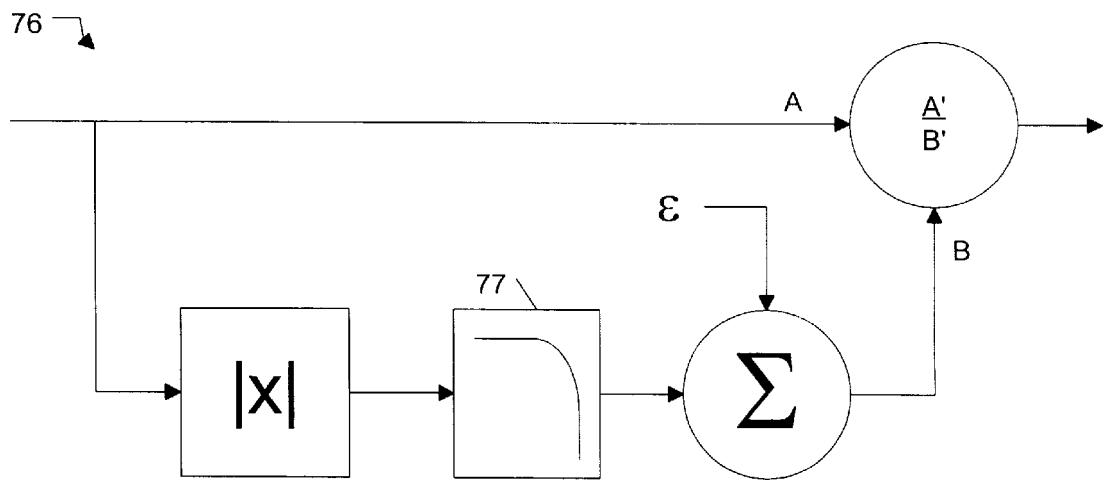
FIG. 3D is a block diagram of a feedforward AGC normalization unit.

Referring to FIG. 3D, in another alternative AGC embodiment, the feedback AGC units may be replaced by a feedforward AGC unit 76. As with the above-described feedback AGC units, this AGC implementation enhances signal onsets and the output converges to 1 for a constant input. In this embodiment, the time constant of IIR low pass filter 77 preferably is set to 320 ms or 640 ms for both the lowpass and bandpass channels, and E preferably is set to a value of 1. One or more series-connected feedforward units 70 may be used in the lowpass and bandpass channels of normalizer 34.

Referring back to FIG. 3A, the spectral resolution of bandpass stream 58 is halved by a spectral smoother 78 which is configured to sum the features from adjacent channels. By reducing the spectral resolution of feature extractor 12, spectral smoother 78 reduces the complexity of the acoustic model and reduces the sensitivity of recognizer 10 to speaker-dependent signal characteristics without detrimentally affecting the description of input speech signal 18.

Figure 3E:
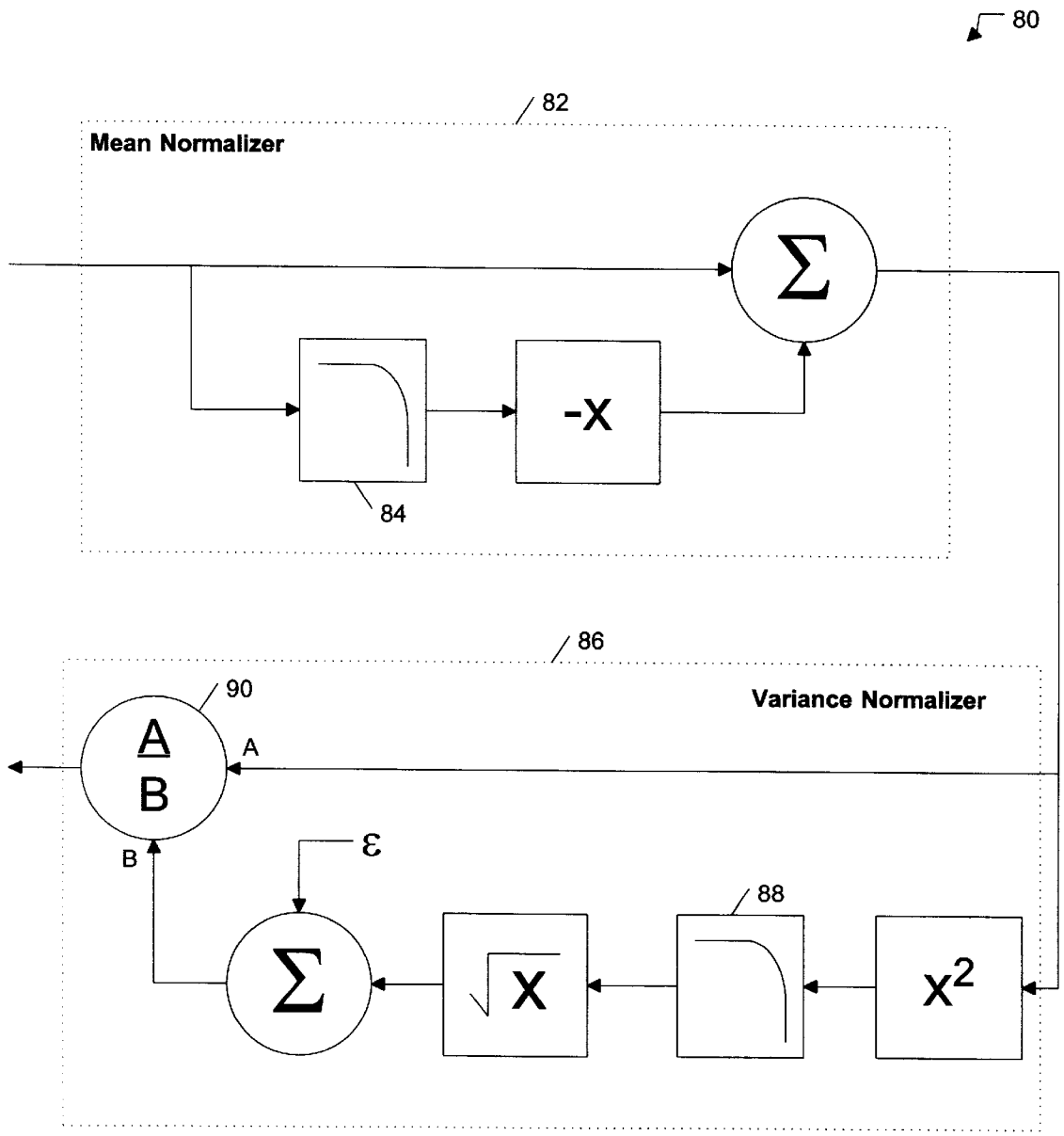
FIG. 3E is a block diagram of a mean normalizer and a variance normalizer for performing on-line normalization of the acoustic features extracted from an input speech signal.

Referring to FIGS. 3A and 3E, all features are normalized by an on-line normalizer 80 to have means of zero and variances of one. On-line normalizer 80 reduces the effects of slowly varying additive offsets and multiplicative gain terms caused, for example, by additive noise and spectral shaping. On-line normalizer 80 includes a mean normalizer 82 with a lowpass IIR filter 84 that computes an estimate of the signal mean (with an exponentially decaying window into the past) which is subtracted from the signal (x). On-line normalizer 80 also includes a variance normalizer 86 with a lowpass IIR filter 88 that computes an estimate of the standard deviation of the signal. The signal is normalized with respect to the estimated standard deviation by a divider unit 90. A small offset e is added to the estimated standard deviation to avoid division by zero. For the first utterance in a speech signal, the estimates of the mean and standard deviation are initialized from estimates previously computed over training data. For each following utterance, the final estimates from the previous utterance are used.

The time constants of the lowpass filters in normalizer 80 control the duration of the processing memory. The longer the time constant, the more reliable the estimates of the mean and variance; however, longer time constants also entail slower adaptation to changes in the acoustic environment. In one embodiment, the means and variances are estimated using single-pole lowpass filters with a time constant preferably in the range of 250 ms to 4 seconds, and more preferably a time constant of 2 seconds, and the offset ε to the standard deviation estimate is set to 1.

Other embodiments are within the scope of the claims. For example, referring to FIG. 4, another embodiment of feature extractor 12 includes a Bark-scale power-spectral filterbank 100 and a bank of square root generators 102, filter system 32 includes parallel lowpass and bandpass filtering systems 104, 106, and normalizer 34 includes AGC networks 108, 110.

Initially, feature generator 30 segments input speech signal 18 into 32 ms frames with a 16 ms frame step, each frame is multiplied by a Hamming window, and the power spectrum for each frame is computed with a Fast Fourier Transform (FFT). The power spectrum is accumulated into critical-band-like frequency channels 112 by convolution with filterbank 100. Filterbank 100 includes fourteen overlapping, triangular filters that have bandwidths and spacings of 1.0 Bark and cover the frequency range of 160–4000 Hz. The critical-band-like power spectrum is converted into an amplitude spectrum 114 by square root generators 102 which are configured to take the square root of the output of filterbank 100.

Other filterbanks may be used, as explained above in connection with the embodiment of FIG. 3A.

The resulting critical band amplitude spectrum 114 is filtered in parallel by lowpass filtering system 104 and bandpass filtering system 106 of filter system 32. Lowpass filter system 104 includes a bank of FIR lowpass filters with a passband of 0–16 Hz. Bandpass filter system 106 includes a bank of FIR bandpass filters with a passband of 2–16 Hz and 5 dB of DC suppression. Lowpass and bandpass filtering systems 104, 106 produce lowpass and bandpass filtered streams 116, 118, respectively.

Lowpass and bandpass filtered streams 116, 118 are processed through AGC networks 108, 110, respectively. Each AGC network 108, 110 may include one or more series-connected feedback AGC units. In one AGC embodiment, each channel of AGC networks 108, 110 includes two upstream and downstream series-connected feedback AGC units, as described above in connection with the embodiment of FIG. 3B. In one implementation, in the lowpass stream the upstream AGC unit has a time constant of 320 ms and the downstream AGC unit has a time constant of 320 ms, and in the bandpass stream the upstream AGC unit has a time constant of 160 ms and the downstream AGC unit has a time constant of 640 ms. Other AGC implementations may be used, as explained above in connection with the embodiment of FIG. 3A.

Figure 4:
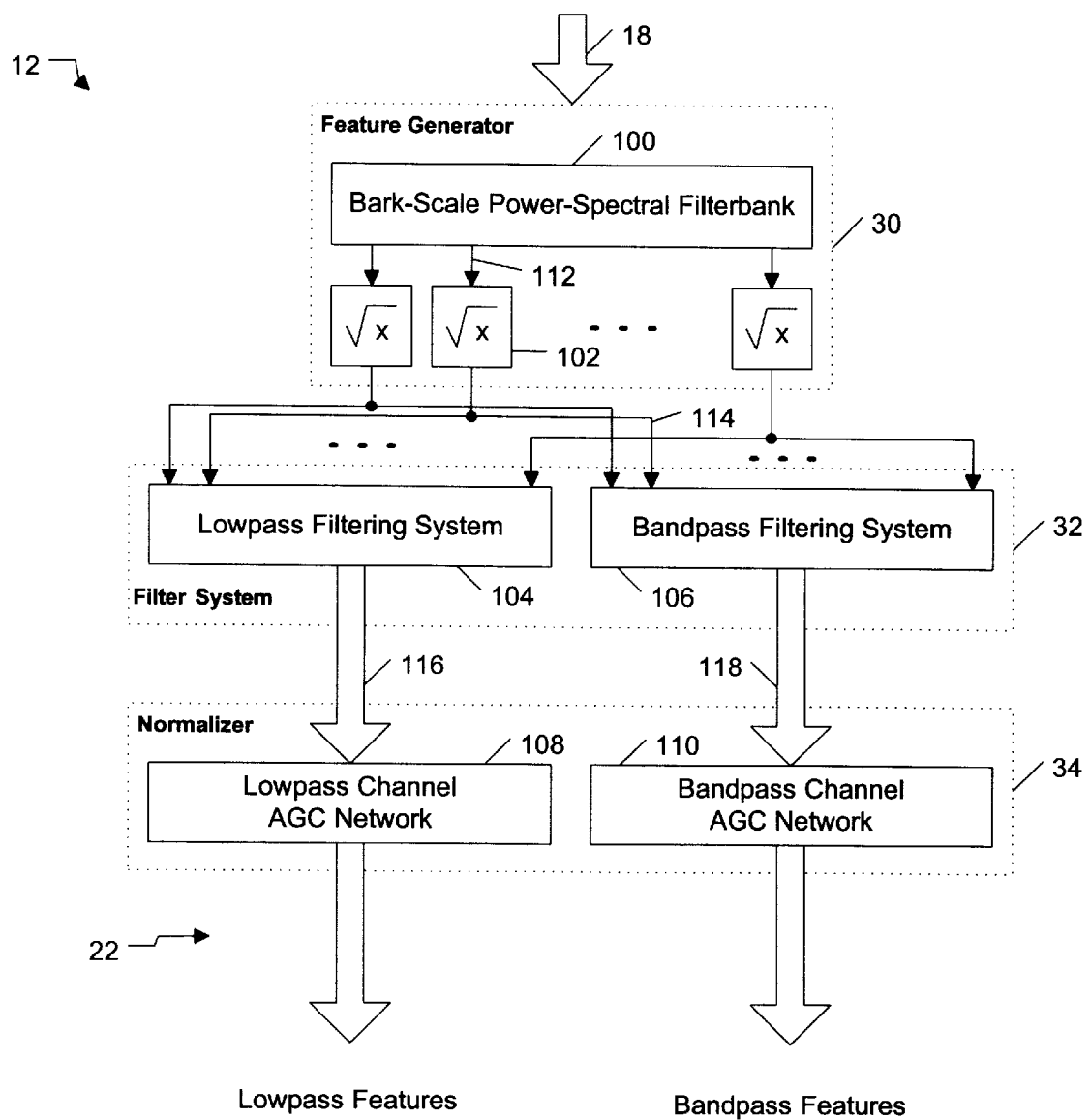
FIG. 4 is a block diagram of another embodiment of the feature extractor of FIG. 2.

On-line normalizer 80 (FIG. 3A), which normalized the feature means and variances in the embodiment of FIG. 3A, is replaced by an off-line per-utterance normalization step in the embodiment of FIG. 4.

Still other embodiments are within the scope of the claims.

What is claimed is:

1. An apparatus for generating a parametric representation of a speech signal, comprising:
   a feature generator configured to compute a time sequence of short-term parameters of the speech signal;
   a filter system configured to filter the time sequences of the short-term parameters using a lowpass filter and a bandpass filter in parallel; and
   a normalizer configured to normalize the filtered parameters with respect to one or more previous values of the filtered parameters.

2. The apparatus of claim 1, wherein the feature generator is configured to compute short-term spectral parameters of the speech signal.

3. The apparatus of claim 2, wherein the feature generator is configured to compute parameters of an auditory-like spectrum.

4. The apparatus of claim 1, wherein the filter system includes one or more linear filters.

5. The apparatus of claim 1, wherein the normalizer is configured to normalize the filtered parameters with respect only to previous values of the filtered parameters.

6. The apparatus of claim 4, wherein the lowpass filter is characterized by a cutoff frequency of about 8 Hz and the bandpass filter is characterized by a passband of about 8–16 Hz.

7. The apparatus of claim 6, wherein the lowpass filter is characterized by a moderate degree of DC attenuation.

8. The apparatus of claim 7, wherein the lowpass filter has about 5 dB of DC attenuation.

9. The apparatus of claim 1, wherein the normalizer is configured to normalize the filtered parameters with respect to an average of preceding parameter values.

10. The apparatus of claim 9, wherein the normalizer includes one or more feedback AGC units.

11. The apparatus of claim 10, wherein each feedback AGC unit includes a feedback loop with a feedback lowpass filter.

12. The apparatus of claim 11, wherein the feedback lowpass filter is a single-pole IIR filter.

13. The apparatus of claim 1, wherein the normalizer includes two or more series-connected feedback AGC units each having a single-pole IIR filter, the single-pole IIR filter of any one of the AGC units being characterized by a cutoff frequency that is less than or equal to the cutoff frequency of the IIR filters in preceding AGC units and greater than or equal to the cutoff frequency of the IIR filters in succeeding AGC units.

14. The apparatus of claim 1, wherein the normalizer includes first and second series-connected feedback AGC units, the first AGC unit having a single-pole lowpass IIR filter characterized by a cutoff frequency of about 1 Hz, and the second AGC unit having a single-pole lowpass IIR filter characterized by a cutoff frequency of about 0.5 Hz.

15. A method for generating a parametric representation of a speech signal, comprising:
   computing short-term parameters of the speech signal;
   filtering time sequences of the short-term parameters using a lowpass filter channel and a bandpass filter channel in parallel; and
   normalizing the filtered parameters.

16. The method of claim 15, wherein the steps of filtering and normalizing are performed in steps separate from one another.

17. The method of claim 15, wherein short-term spectral parameters of the speech signal are computed.

18. The method of claim 17, wherein parameters of an auditory-like spectrum are computed.

19. The method of claim 15, wherein the filter system includes one or more linear filters.

20. The method of claim 15, wherein normalizing includes normalizing the filtered parameters with respect only to previous values of the filtered parameters.

21. The method of claim 20, wherein the lowpass channel passes parameters with a frequency of about 0–8 Hz and the bandpass channel passes parameters with a frequency of about 8–16 Hz.

22. The method of claim 21, wherein the lowpass channel filters parameters with a moderate degree of DC attenuation.

23. The method of claim 22, wherein the lowpass channel attenuates parameters with about 5 dB of DC attenuation.

24. The method of claim 15, wherein the filtered parameters are normalized with respect to an average of preceding parameter values.

25. The method of claim 15, wherein the filtered parameters are normalized by one or more feedback AGC units.

26. The method of claim 25, wherein each feedback AGC unit provides a feedback loop with a feedback lowpass filter.

27. The method of claim 21, wherein a single-pole IIR filter provides low-pass filtration in the feedback loop.

28. The method of claim 15, wherein normalization further comprises:

providing two or more series-connected feedback AGC units each having a single-pole IIR filter; and filtering parameters through the single-pole IIR filters, the single-pole IIR filter of any one of the AGC units being characterized by a cutoff frequency that is less than or equal to a cutoff frequency of IIR filters in preceding AGC units and greater than or equal to a cutoff frequency of IIR filters in succeeding AGC units.

29. The method of claim 15, wherein normalization further comprises:

providing a first and second series-connected feedback AGC units, each feedback AGC unit includes a single-pole lowpass IIR filter; and filtering parameters through the single-pole lowpass IIR filters, the single-pole lowpass IIR filter of the first feedback AGC unit being characterized by a cutoff frequency of about 1 Hz, and the single-pole lowpass IIR filter of the second feedback AGC unit beign characterized by a cutoff frequency of about 0.5 Hz.

30. An apparatus for generating a parametric representation of a speech signal, comprising:

a feature generator configured to compute a time sequence of short-term parameters of the speech signal;

a filter system configured to filter the time sequences of short-term parameters to produce multiple filtered streams of short-term parameters; and a normalizer configured to normalize the filtered streams of short-term parameters produced by the filter system, wherein the normalizer normalizes each filtered stream independently of the normalization of every other filtered stream.

31. The apparatus of claim 30, wherein the feature generator is configured to compute short-term spectral parameters of the speech signal.

32. The apparatus of claim 31, wherein the feature generator is configured to compute parameters of an auditory-like spectrum.

33. The apparatus of claim 30, wherein the filter system includes one or more linear filters.

34. The apparatus of claim 33, wherein the lowpass filter is characterized by a cutoff frequency of about 8 Hz and the bandpass filter is characterized by a passband of about 8–16 Hz.

35. The apparatus of claim 34, wherein the lowpass filter is characterized by a moderate degree of DC attenuation.

36. The apparatus of claim 30, wherein the normalizer is configured to normalize the filtered parameters with respect to an average of preceding parameter values.

37. The apparatus of claim 36, wherein the normalizer includes one or more feedback AGC units.

38. The apparatus of claim 37, wherein each feedback AGC unit includes a feedback loop with a feedback lowpass filter.

39. The apparatus of claim 38, wherein the feedback lowpass filter is a single-pole IIR filter.

40. The apparatus of claim 30, wherein the normalizer includes two or more series-connected feedback AGC units each having a single-pole IIR filter, the single-pole IIR filter of any one of the AGC units being characterized by a cutoff frequency that is less than or equal to the cutoff frequency of the IIR filters in preceding AGC units and greater than or equal to the cutoff frequency of the IIR filters in succeeding AGC units.

41. The apparatus of claim 30, wherein the normalizer includes first and second series-connected feedback AGC units, the first AGC unit having a single-pole lowpass IIR filter characterized by a cutoff frequency of about 1 Hz, and the second AGC unit having a single-pole lowpass IIR filter characterized by a cutoff frequency of about 0.5 Hz.

* * * * *